(12) United States Patent
Kawanishi

(10) Patent No.: US 12,527,537 B2
(45) Date of Patent: Jan. 20, 2026

(54) RADIATION IMAGING SYSTEM, CONTROL APPARATUS, RADIATION IMAGING APPARATUS, CONTROL METHODS THEREFOR, AND NON-TRANSITORY COMPUTER-READABLE STORAGE MEDIUM

(71) Applicant: CANON KABUSHIKI KAISHA, Tokyo (JP)

(72) Inventor: Tomohiro Kawanishi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 316 days.

(21) Appl. No.: 18/185,149

(22) Filed: Mar. 16, 2023

(65) Prior Publication Data
US 2023/0309947 A1    Oct. 5, 2023

(30) Foreign Application Priority Data

Mar. 29, 2022  (JP) .................... 2022-054320

(51) Int. Cl.
*A61B 6/00* (2024.01)

(52) U.S. Cl.
CPC .................... *A61B 6/542* (2013.01)

(58) Field of Classification Search
CPC ......... A61B 6/542; A61B 6/00; A61B 6/5205; A61B 6/5294; A61B 6/54; A61B 6/487; A61B 6/4233; A61B 6/5258; A61B 6/544; A61B 6/5211; A61B 6/488; A61B 6/545; A61B 6/4283; A61B 6/4208; A61B 6/469; A61B 6/563; A61B 6/08; A61B 6/547; A61B 6/4452; A61B 6/588; A61B 6/4266; A61B 6/5217; A61B 6/52; A61B 6/405; A61B 6/4241; A61B 6/505; A61B 6/4085; A61B 6/482; A61B 6/0407; A61B 6/4411; A61B 6/4464; A61B 6/4476; A61B 6/461; A61B 6/582; A61B 6/06; A61B 6/42; A61B 6/4291; A61B 6/56; A61B 2560/0276; A61B 6/585; H04N 25/30; H04N 25/671; H04N 25/63; H04N 5/321; H04N 25/709; H04N 23/30; H04N 23/80; H04N 23/70;

(Continued)

(56) References Cited

U.S. PATENT DOCUMENTS 10,130,321 B2    11/2018  Kawanishi
10,271,814 B2    4/2019   Kawanishi (Continued)

FOREIGN PATENT DOCUMENTS

JP         2020-89714 A      6/2020

*Primary Examiner* — Irakli Kiknadze
(74) *Attorney, Agent, or Firm* — VENABLE LLP

(57) ABSTRACT

A radiation imaging system includes a radiation imaging apparatus having a function of automatic exposure control and a control apparatus, and in the radiation imaging apparatus, offset data for a detecting pixel used for the automatic exposure control is obtained before permission to start irradiation after reception of a start request signal. The system determines whether to perform the automatic exposure control, permits start of irradiation after the offset data is obtained if it is determined that the automatic exposure control is performed, and permits start of irradiation upon omitting obtaining of the offset data if it is determined that the automatic exposure control is not performed.

15 Claims, 9 Drawing Sheets

(58) Field of Classification Search
CPC .......... G01T 1/17; G01T 7/005; G01T 1/026;
G01T 1/2985; G01T 1/247; G01T 7/00;
G01T 1/2992; G01T 1/245; G01T 1/08;
G01T 1/1603; G01T 1/15; G01T 1/02;
G01T 1/161; G01T 1/20184; G01T
1/2018; H05G 1/44; H05G 1/38; H05G
1/28; H05G 1/56; H05G 1/34; H05G
1/42; H05G 1/40; G06T 7/0014; G06T
2207/10128; G06T 7/11; G06T
2207/30012; G06T 2207/10144; G06T
2207/10116; G06T 2207/20152; G06T
2207/20224; G06T 7/0012; G06T 7/70;
H10F 39/8023; H10F 39/802; H10F
39/8027; H10F 39/809; G01N 23/04;
H04Q 9/00; G01V 5/22
USPC ...................................... 378/95, 62
See application file for complete search history.

(56) References Cited

U.S. PATENT DOCUMENTS

| 2009/0168951 | A1* | 7/2009 | Yan | A61B 6/588 |
| | | | | 378/8 |
| 2019/0223822 | A1* | 7/2019 | Takagi | A61B 6/542 |
| 2020/0008766 | A1* | 1/2020 | Watanabe | G01T 7/00 |
| 2020/0205767 | A1* | 7/2020 | Niwa | A61B 6/487 |
| 2021/0251595 | A1* | 8/2021 | Miyake | A61B 6/5205 |

\* cited by examiner

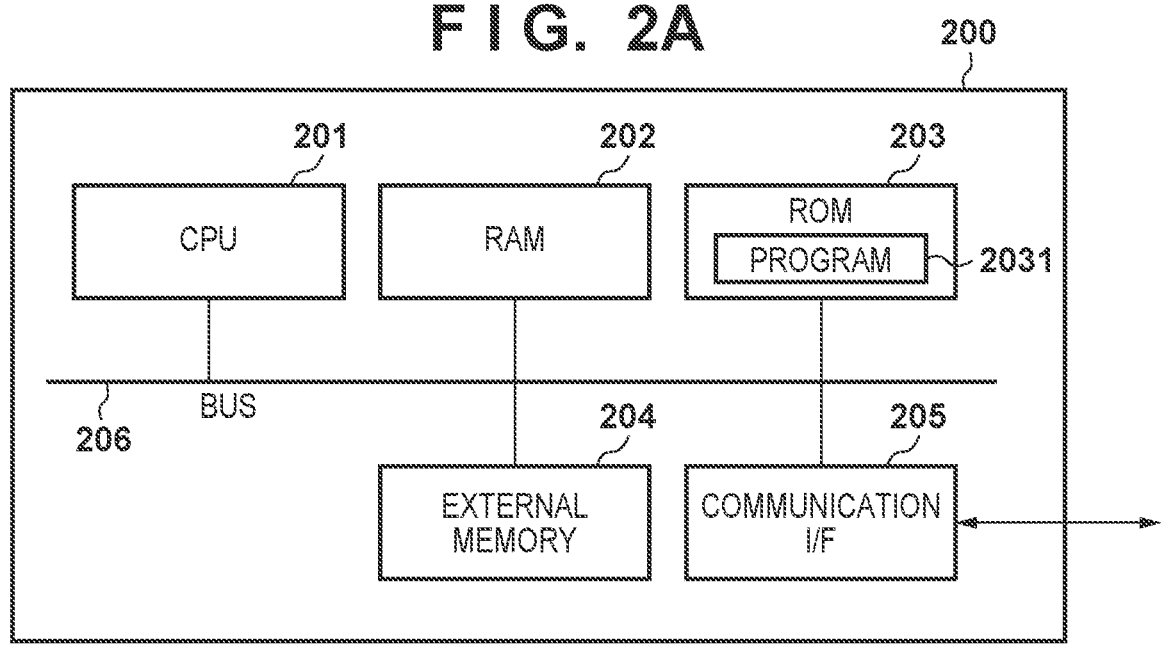
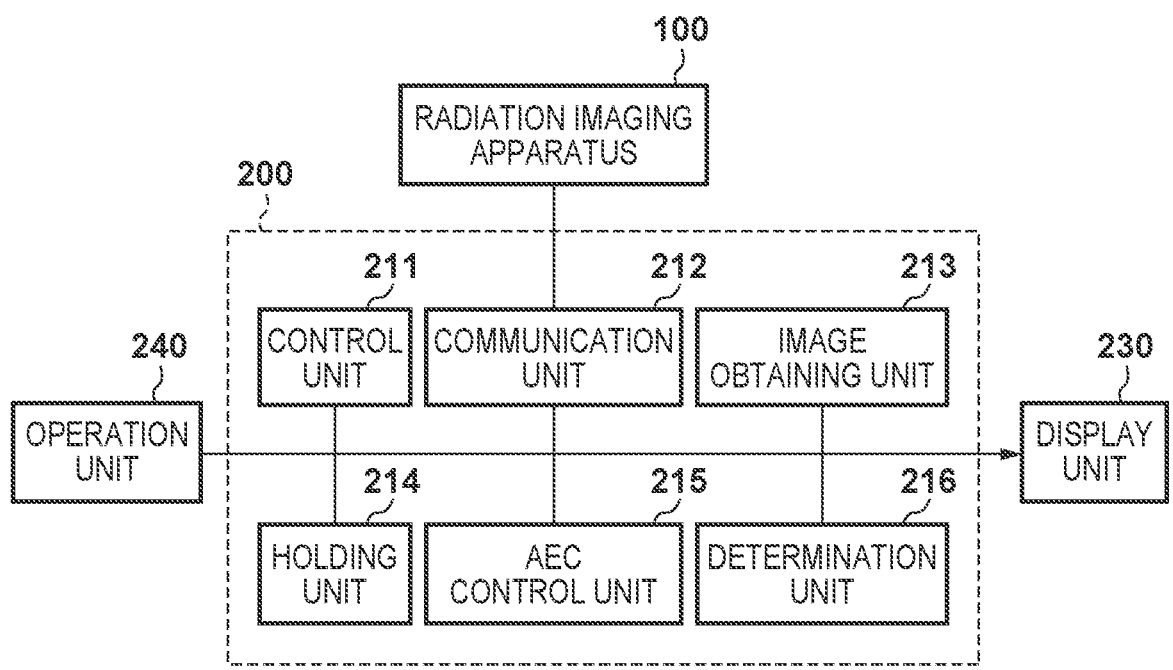

FIG. 9A

| IMAGING TECHNIQUE | AEC |
|---|---|
| ●●●●● | USE |
| △△△△△ | DO NOT USE |
| ◇◇◇◇◇ | USE |
| .... | .... |

FIG. 9B

| IMAGING TECHNIQUE | RADIATION IMAGING APPARATUS (TYPE) | AEC |
|---|---|---|
| ●●●●● | AAAAAA | USE |
| | BBBBBB | USE |
| | CCCCCC | DO NOT USE |
| △△△△△ | AAAAAA | DO NOT USE |
| | BBBBBB | USE |
| | CCCCCC | USE |
| ◇◇◇◇◇ | AAAAAA | USE |
| | BBBBBB | DO NOT USE |
| | CCCCCC | DO NOT USE |
| .... | .... | .... | ns, a control apparatus, a radiation imaging apparatus, control methods therefor, and a non-transitory computer-readable storage medium.

RADIATION IMAGING SYSTEM, CONTROL APPARATUS, RADIATION IMAGING APPARATUS, CONTROL METHODS THEREFOR, AND NON-TRANSITORY COMPUTER-READABLE STORAGE MEDIUM

BACKGROUND OF THE INVENTION

Field of the Invention

The present invention relates to a radiation imaging system, a control apparatus, a radiation imaging apparatus, control methods therefor, and a non-transitory computer-readable storage medium.

Description of the Related Art

Recently, studies have been made on the multifunctionality of radiation detectors for detecting radiation such as X-rays, which are used in the medical field. For one instance, studies have been made on a technique of incorporating a function of monitoring the irradiation dose of radiation into a radiation detector. For example, this function makes it possible to implement Automatic Exposure Control (AEC). AEC operates to detect the integral irradiation dose of radiation transmitted through a subject and stop irradiation by a radiation generating unit at the time when the detected integral irradiation dose reaches a proper dose.

An AEC function is implemented by detecting the dose of radiation with a detecting pixel for AEC which is arranged in a radiation detection region (receptor field) for the measurement of radiation used for automatic exposure control inside a radiation detector. AEC of this type operates to obtain data (offset data) for offset correction of the detecting pixel for AEC at the timing without irradiation. Japanese Patent Laid-Open No. 2020-089714 discloses a radiation imaging system that is provided with a correcting pixel lower in sensitivity to radiation than a detecting pixel and obtains data from the correcting pixel and the detecting pixel before the start of irradiation, thereby shortening the time to obtain data for the offset correction of the receptor field.

SUMMARY OF THE INVENTION

According to one aspect of the present invention, there is provided a radiation imaging system including a radiation imaging apparatus having a function of automatic exposure control and a control apparatus, the system comprising: a first obtaining unit configured to obtain offset data for a detecting pixel used for the automatic exposure control before permission to start irradiation after reception of a start request signal in the radiation imaging apparatus; a determination unit configured to determine whether to perform the automatic exposure control; and a control unit configured to permit start of irradiation after the first obtaining unit obtains offset data if the determination unit determines that the automatic exposure control is performed and to permit start of irradiation upon omitting offset data obtaining by the first obtaining unit if the determination unit determines that the automatic exposure control is not performed.

Further features of the present invention will become apparent from the following description of exemplary embodiments with reference to the attached drawings.

BRIEF DESCRIPTION OF THE DRAWINGS

FIG. 2A is a block diagram showing an example of the hardware arrangement of a control apparatus;

FIG. 2B is a block diagram showing an example of the function arrangement of the control apparatus;

FIGS. 9A and 9B are views each showing an example of a table indicating imaging techniques and the availability of AEC.

DESCRIPTION OF THE EMBODIMENTS

Figure 1A:
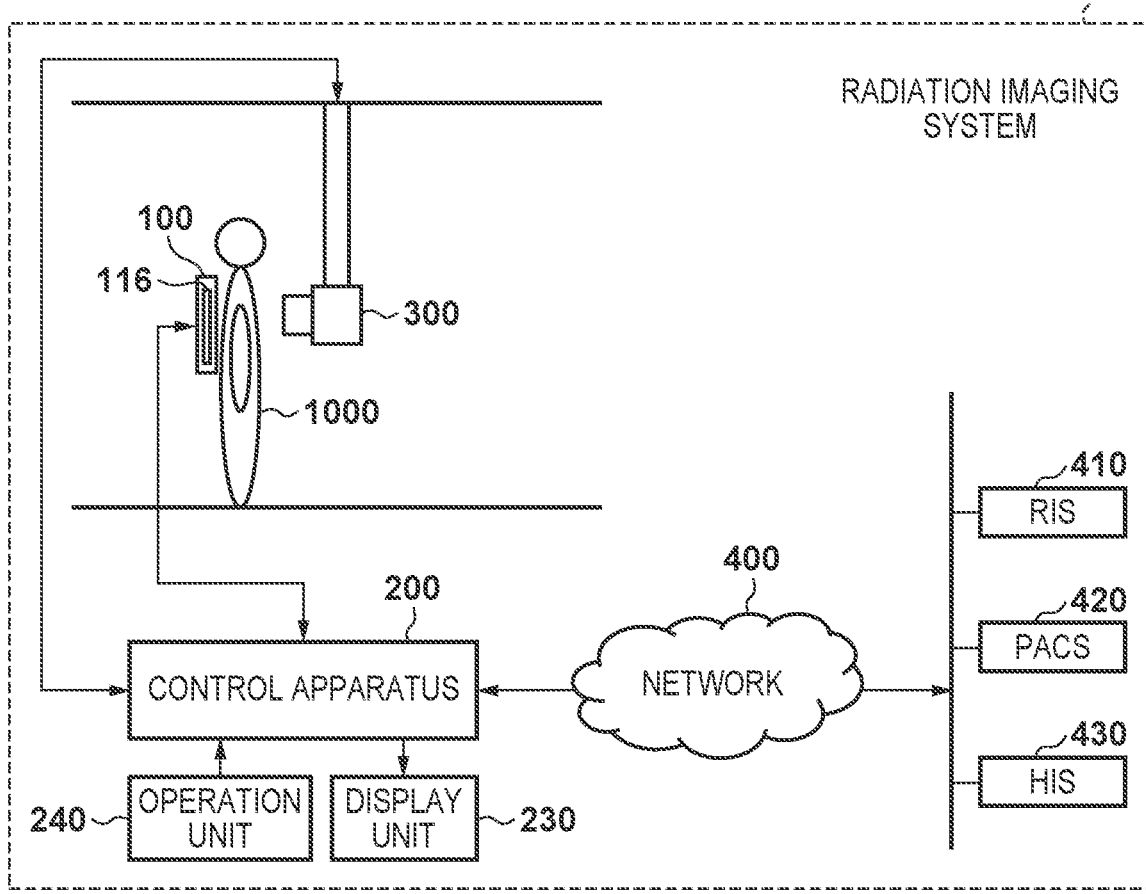
FIG. 1A is a view showing the schematic arrangement of a radiation imaging system according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

The method disclosed in Japanese Patent Laid-Open No. 2020-089714 obtains offset data for the offset correction of a receptor field immediately before the start of irradiation regardless of the use of AEC. For this reason, a delay may occur until the start of irradiation in radiation imaging without the use of AEC.

According to one aspect of the following embodiments, there is provided a technique of preventing or reducing a decrease in examination efficiency by controlling the performance/non-performance of offset data obtaining.

First Embodiment

FIG. 1A is a schematic view showing an example of the schematic arrangement of a radiation imaging system 10 according to the first embodiment. The radiation imaging system 10 includes a radiation imaging apparatus 100, a control apparatus 200, a radiation generating unit 300, an RIS 410, a PACS 420, and an HIS 430. Note that RIS is an abbreviation for radio information systems. PACS is an abbreviation for picture arching and communication systems. HIS is an abbreviation for hospital information systems.

The control apparatus 200 includes a display unit 230 and an operation unit 240 and is connected to the radiation generating unit 300 via a wire and connected to the radiation imaging apparatus 100 via wired communication or wireless communication, thereby communicating with and controlling each equipment. Wired communication can be implemented via Local Area Network (LAN) such as Ethernet® but may be implemented by other types of wired communication schemes. An arrangement for wireless communication includes, for example, an antenna and a communication IC. A circuit board including a communication IC performs protocol communication processing based on a wireless LAN via the antenna. Note that the frequency band, standards, and schemes used in wireless communication are not specifically limited. That is, proximity wireless communications such as NFC and Bluetooth and schemes such as UWB may be used, and the wireless communication arrangement may include a plurality of wireless communication schemes and perform communication by selecting one of the schemes as appropriate. In addition, the control apparatus 200 is connected to the RIS 410, the PACS 420, and the HIS 430 via a network 400 and can exchange radiation images, patient information, and the like with them.

The display unit 230 displays imaging examination information, captured radiation images, various types of information, and the like under the control of the control apparatus 200. For example, the control apparatus 200 performs image processing for the radiation image data obtained by the radiation imaging apparatus 100 and displays the resultant image as a radiation image on the display unit 230. Upon receiving the input information from the operator, the operation unit 240 supplies the operation signal to the control apparatus 200. In this embodiment, the display unit 230 includes, for example, a monitor such as a liquid crystal display. The operation unit 240 also includes a keyboard, a pointing device (for example, a mouse), and a touch panel.

The radiation generating unit (radiation generator) 300 includes a radiation tube that generates radiation and irradiates a subject 1000 such as a patient with the radiation. As shown in FIG. 1A, this embodiment exemplifies a case in which the radiation generating unit 300 is installed in a room for radiation imaging, and the locational range in which the radiation generating unit 300 emits radiation is limited to a predetermined range. However, the present invention is not limited to this. For example, the radiation generating unit 300 may be transportable.

Figure 1B:
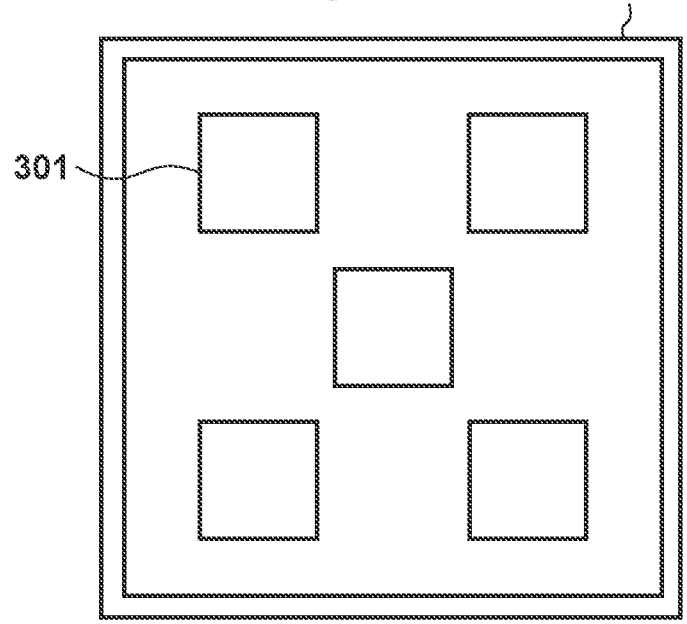
FIG. 1B is a view showing an example of a receptor field placement incorporated in a radiation detector.

The radiation imaging apparatus 100 generates an image based on radiation emitted from the radiation generating unit 300. The radiation imaging apparatus 100 has a function (AEC function 116) for performing automatic exposure control (to be referred to as AEC hereinafter) and includes one or a plurality of radiation detection regions (to be referred to as receptor fields 301 hereinafter) for measuring radiation, as shown in FIG. 1B. The radiation imaging apparatus 100 measures the dose of radiation transmitted through a subject with one or a plurality of receptor fields 301 selected in advance and performs control to stop irradiation when the measured dose reaches a predetermined dose. The radiation imaging apparatus 100 is installed in a room or on a desk in accordance with the locational range in which the radiation generating unit 300 emits radiation.

Assume that in the following description, the radiation imaging system 10 according to this embodiment includes the RIS 410, the PACS 420, and the HIS 430. However, this system may be configured without using at least some of these components. In addition, FIG. 1A shows an example in which the radiation generating unit 300 and the radiation imaging apparatus 100 respectively serve as a radiation generating unit and a radiation detector. However, a combination of the radiation generating unit and the radiation detector is not limited to this. For example, the radiation imaging system 10 may include a further combination of a radiation generating unit and a radiation detector.

An example of the arrangement of the control apparatus 200 according to this embodiment will be described next. FIG. 2A is a block diagram showing an example of the hardware arrangement of the control apparatus 200. The control apparatus 200 includes a CPU 201, a RAM 202, a ROM 203, an external memory 204, and a communication I/F 205 which are mutually connected to each other via a bus 206.

The Central Processing Unit (CPU) 201 comprehensively controls the operation of the control apparatus 200 and is connected to the respective components (the RAM 202 to the communication I/F 205) shown in FIG. 2A via the bus 206 to control them. The Random Access Memory (RAM) 202 functions as the main memory, work area, and the like of the CPU 201. When performing processing, the CPU 201 loads a necessary computer program 2031, basic data, and the like from the ROM 203 into the RAM 202 and performs the computer program 2031 and the like to implement various types of functional operations. The Read Only Memory (ROM) 203 stores the computer program 2031 necessary for the CPU 201 to perform processing, basic data, and the like. Note that the computer program 2031 may be stored in the external memory 204.

The external memory 204 is a large-capacity storage device and is implemented by, for example, a hard disk drive or IC memory. The external memory 204 stores, for example, various types of data and various types of information which are necessary for the CPU 201 to perform processing using the computer program 2031 or the like. The external memory 204 also stores, for example, various types of data and various types of information obtained by the CPU 201 executing the computer program 2031 or the like. The communication I/F 205 governs communication with the outside. For example, the communication I/F 205 is connected to the radiation imaging apparatus 100 to transmit signals for controlling the driving of a drive circuit 150 and a readout circuit 160 to the radiation imaging apparatus 100. In addition, the communication I/F 205 receives the digital radiation image obtained by a signal processing unit 170 (to be described later) from the radiation imaging apparatus 100. In addition, the communication I/F 205 is connected to the network 400 and hence can communicate with the RIS 410, the PACS 420, and the HIS 430.

The bus 206 communicably connects the CPU 201 to the RAM 202, the ROM 203, the external memory 204, and the communication I/F 205. Note that the control apparatus 200 according to this embodiment is provided as dedicated built-in equipment but may be implemented by a general-purpose information processing apparatus such as a Personal Computer (PC) or a tablet terminal.

FIG. 2B is a block diagram showing an example of the functional arrangement of the control apparatus 200 according to this embodiment. The control apparatus 200 includes a control unit 211, a communication unit 212, an image obtaining unit 213, a holding unit 214, an AEC control unit 215, and a determination unit 216. Each function is implemented by the CPU 201 deploying the computer program 2031 stored in the ROM 203 into the RAM 202 and executing the program. Note that each function may be implemented by dedicated hardware or cooperation between a computer program and hardware.

The control unit 211 determines, generates, and edits various types of set information set in the radiation imaging system 10. The communication unit 212 communicates with the radiation generating unit 300 and the radiation imaging apparatus 100. The image obtaining unit 213 obtains a radiation image from the radiation imaging apparatus 100 via the communication unit 212. The holding unit 214 holds various types of set information in the radiation imaging system 10 and various types of information obtained via the communication unit 212 in a storage unit (for example, the RAM 202 and the external memory 204). The AEC control unit 215 controls offset data obtaining and performance of AEC in the radiation imaging apparatus 100 in accordance with the determination result (indicating whether to perform offset data obtaining and whether to use AEC) obtained by the determination unit 216. The determination unit 216 determines, for example, whether to obtain offset data for the receptor field 301 and whether to perform radiation imaging using AEC. Note that each functional block described above is merely an example, and the control apparatus 200 may be configured not to include some of the above functional blocks or configured to further include a functional block.

Figure 3:
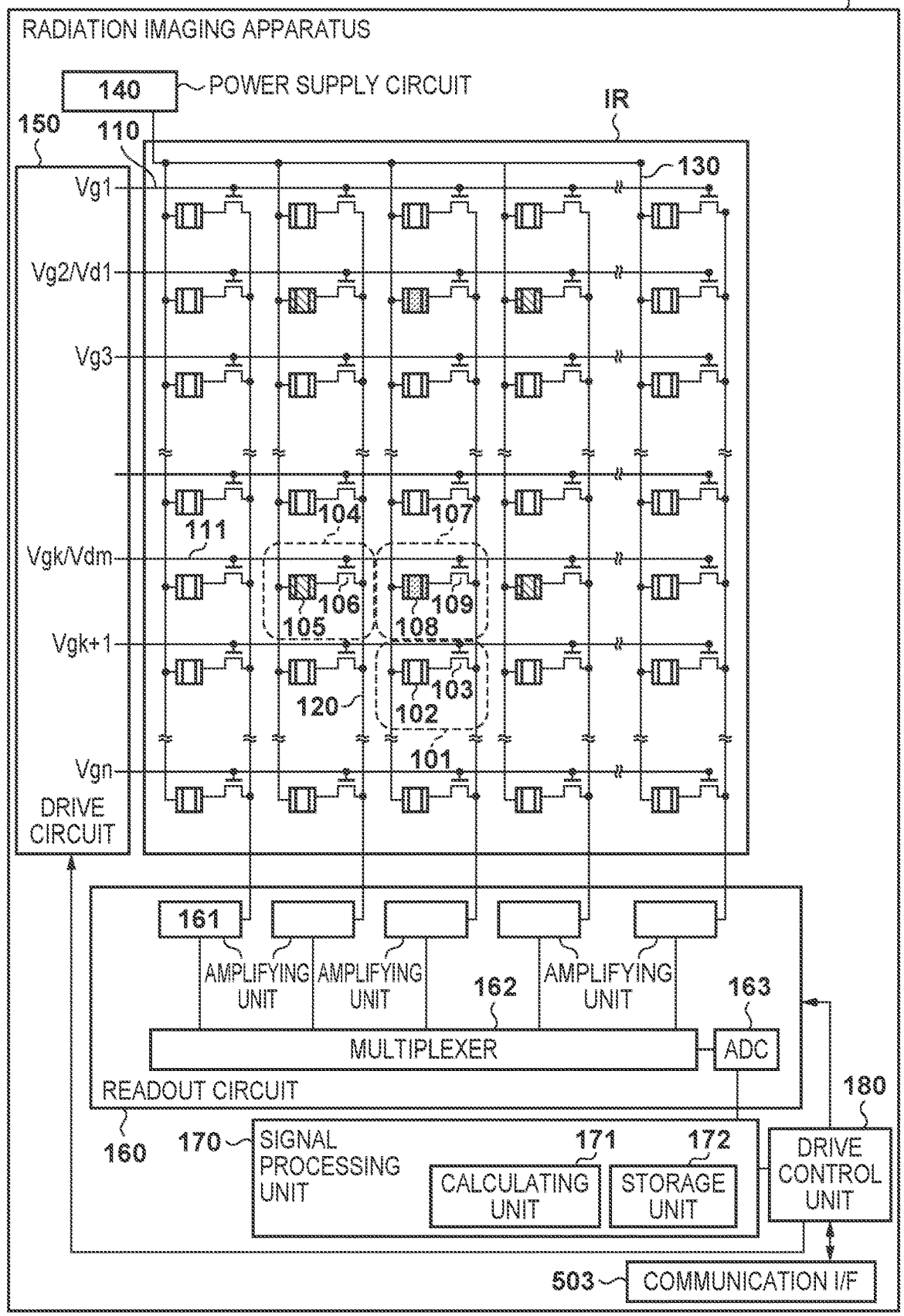
FIG. 3 is a view showing an example of the arrangement of a radiation imaging apparatus according to the first embodiment.

FIG. 3 shows an example of the arrangement of the radiation imaging apparatus 100 according to the first embodiment. The radiation imaging apparatus 100 includes a plurality of pixels arrayed in an imaging region IR so as to form a plurality of rows and a plurality of columns, a plurality of drive lines 110, and a plurality of signal lines 120. The plurality of drive lines 110 are arranged in correspondence with the plurality of rows of the pixels. Each drive line 110 corresponds to one of the pixel rows. The plurality of signal lines 120 are arranged in correspondence with the plurality of columns of the pixels. Each signal line 120 corresponds to one of the pixel columns.

The plurality of pixels include a plurality of imaging pixels 101 used to obtain a radiation image, one or more detecting pixels 104 used to monitor the irradiation dose of radiation, and one or more correcting pixels 107 used to correct the irradiation dose of radiation. The correcting pixel 107 is lower in sensitivity to radiation than the detecting pixel 104. The receptor field 301 is a region in which the detecting pixel 104 described above is arranged.

The imaging pixel 101 includes a conversion element 102 that converts radiation into an electrical signal and a switch element 103 that connects the corresponding signal line 120 and the conversion element 102 to each other. The detecting pixel 104 includes a conversion element 105 that converts radiation into an electrical signal and a switch element 106 that connects the corresponding signal line 120 and the conversion element 105 to each other. The detecting pixel 104 is arranged so as to be included in the row and the column constituted by the plurality of imaging pixels 101. The correcting pixel 107 includes a conversion element 108 that converts radiation into an electrical signal and a switch element 109 that connects the signal line 120 and the conversion element 108 to each other. The correcting pixel 107 is arranged so as to be included in the row and the column constituted by the plurality of imaging pixels 101. Referring to FIG. 3, the imaging pixel 101, the detecting pixel 104, and the correcting pixel 107 are discriminated from each other by hatching the conversion element 102, the conversion element 105, and the conversion element 108 in different manners.

The conversion element 102, the conversion element 105, and the conversion element 108 each may be constituted by a scintillator that converts radiation into light and a photoelectric conversion element that converts light into an electrical signal. In general, a scintillator is formed into a sheet-like shape so as to cover the imaging region IR and is shared by a plurality of pixels. In place of the scintillator, the conversion element 102, the conversion element 105, and the conversion element 108 each may be formed from a conversion element that directly converts radiation into an electrical signal.

The switch element 103, the switch element 106, and the switch element 109 each may include a thin-film transistor (TFT) whose active region is formed from a semiconductor such as amorphous silicon or polycrystalline silicon.

The first electrode of the conversion element 102 is connected to the first main electrode of the switch element 103, and the second electrode of the conversion element 102 is connected to a bias line 130. One bias line 130 extends in the column direction and is commonly connected to the second electrodes of the plurality of conversion elements 102 arrayed in the column direction. The bias line 130 receives a bias voltage Vs from a power supply circuit 140. The second main electrodes of the switch elements 103 of one or more imaging pixels 101 included in one column are connected to one signal line 120. The control electrodes of the switch elements 103 of one or more imaging pixels 101 included in one row are connected to one drive line 110.

The detecting pixel 104 and the correcting pixel 107 each have a pixel arrangement similar to that of the imaging pixel 101 and are connected to the corresponding drive line 110 and the corresponding signal line 120. The detecting pixel 104 and the correcting pixel 107 are exclusively connected to the signal line 120. That is, the correcting pixel 107 is not connected to the signal line 120 to which the detecting pixel 104 is connected. The detecting pixel 104 is not connected to the signal line 120 to which the correcting pixel 107 is connected. The imaging pixel 101 may be connected to the same signal line 120 to which the detecting pixel 104 or the correcting pixel 107 is connected.

The drive circuit 150 is configured to supply a drive signal to a pixel to be driven via the plurality of drive lines 110 in accordance with a control signal from a drive unit 218. In this embodiment, a drive signal is a signal for turning on the switch element included in a pixel to be driven. The switch element of each pixel is turned on by a high-level signal and turned off by a low-level signal. Accordingly, this high-level signal is called a drive signal. Supplying a drive signal to a pixel can make the signal accumulated in the conversion element of the pixel ready to be read out by the readout circuit 160. When the drive line 110 is connected to at least one of the detecting pixel 104 and the correcting pixel 107, the drive line 110 is called a detecting drive line 111.

The readout circuit 160 is configured to read out signals from a plurality of pixels via the plurality of signal lines 120. The readout circuit 160 includes a plurality of amplifying units 161, a multiplexer 162, and an ADC 163. Each of the plurality of signal lines 120 is connected to a corresponding one of the plurality of amplifying units 161 of the readout circuit 160. One signal line 120 corresponds to one amplifying unit 161. The multiplexer 162 selects the plurality of amplifying units 161 in a predetermined order and supplies a signal from the selected amplifying unit 161 to the ADC 163. The ADC 163 converts a supplied signal into a digital signal and outputs it.

The signal read out from the imaging pixel 101 is supplied to the signal processing unit 170. The signal processing unit 170 performs processing such as a calculating operation and a storing operation for the signal. More specifically, the signal processing unit 170 includes a calculating unit 171 and a memory unit 172. The calculating unit 171 generates a radiation image based on the signal read out from the imaging pixel 101 and supplies the image to a drive control unit 180. The signals read out from the detecting pixel 104 and the correcting pixel 107 are supplied to the signal processing unit 170. The calculating unit 171 then performs processing such as a calculating operation and a storing operation for the signals. More specifically, the signal processing unit 170 outputs information indicating irradiation of the radiation imaging apparatus 100 based on the signals read out from the detecting pixel 104 and the correcting pixel 107. For example, the signal processing unit 170 detects irradiation of the radiation imaging apparatus 100 and decides the irradiation dose of radiation and/or an integral irradiation dose.

The drive control unit 180 controls the drive circuit 150 and the readout circuit 160 based on information from the signal processing unit 170. The drive control unit 180 controls, for example, the start and end of exposure (the accumulation of electric charge corresponding to emitted radiation by the imaging pixel 101) based on information from the signal processing unit 170.

In order to decide the irradiation dose of radiation, the drive control unit 180 controls the drive circuit 150 to scan only the detecting drive line 111 and set a state ready to read out only signals from the detecting pixel 104 and the correcting pixel 107. The drive control unit 180 then controls the readout circuit 160 to read out a signal from a column corresponding to the detecting pixel 104 and the correcting pixel 107 and output the signal as information indicating the irradiation dose of radiation. With this operation, the radiation imaging apparatus 100 can obtain irradiation information in the detecting pixel 104 during irradiation.

The radiation imaging apparatus 100 transmits an end request signal to the radiation generating unit 300 when the integral irradiation dose of radiation reaches a threshold. The end request signal is a signal for requesting the end of irradiation. The radiation generating unit 300 ends irradiation in response to the reception of an end request signal. Note that an end request signal may be transmitted by a communication I/F 503 to the control apparatus 200 and may be transmitted to the radiation generating unit 300 via the control apparatus 200 or may be directly transmitted from the radiation imaging apparatus 100 to the radiation generating unit 300. The drive control unit 180 decides a dose threshold based on the input value of dose, the irradiation intensity of radiation, a communication delay between the respective units, a processing delay, and the like. The control apparatus 200 may decide a dose threshold and set the threshold in the drive control unit 180. When the irradiation time of radiation reaches an input irradiation upper limit time, the radiation generating unit 300 stops irradiation even if no end request signal is received.

After the stop of irradiation, the radiation imaging apparatus 100 sequentially scans the drive lines 110 to which only the imaging pixels 101 are connected (the drive lines 110 other than the detecting drive lines 111) to cause the readout circuit 160 to read out image signals from the respective imaging pixels 101, thereby obtaining a radiation image. The electric charge accumulated in the detecting pixels 104 is read out during irradiation, and the correcting pixels 107 are shielded against light. For this reason, signals from these pixels cannot be used for the formation of a radiation image. Accordingly, the signal processing unit 170 of the radiation imaging apparatus 100 performs interpolation processing by using pixel values of the imaging pixels 101 around the detecting pixels 104 and the correcting pixels 107 to interpolate pixel values at the positions of these pixels.

Figure 4:
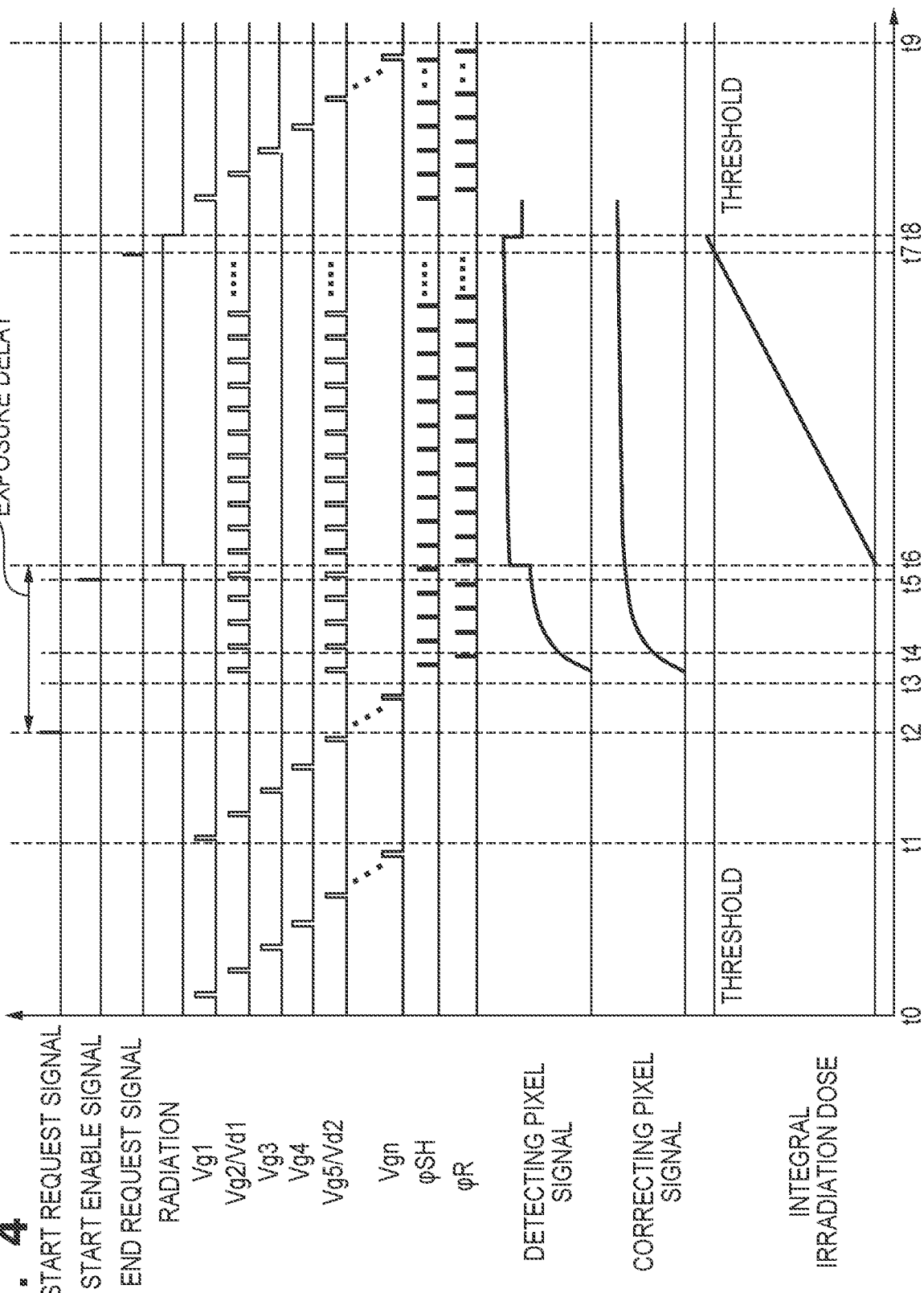
FIG. 4 is a timing chart showing the operation of the radiation imaging apparatus according to the first embodiment.

An example of the operation of the radiation imaging apparatus 100 will be described with reference to FIG. 4. This operation is performed by the cooperation between the signal processing unit 170 and the drive control unit 180 that controls the drive circuit 150 and the readout circuit 160. For this reason, a combination of the signal processing unit 170 and the drive control unit 180 may be called an exposure decision unit. Referring to FIG. 4, "radiation" indicates whether the radiation imaging apparatus 100 is irradiated. In the case of low level, no radiation is applied, whereas in the case of high level, radiation is applied. "Vg1" to "Vgn" indicate drive signals supplied from the drive circuit 150 to the plurality of drive lines 110. "Vgk" corresponds to the drive line 110 on the kth row (k=1, . . . , the total number of drive lines). As described above, some of the plurality of drive lines 110 are also called the detecting drive lines 111. The jth detecting drive line 111 is represented by "Vdj" (j=1, . . . , the total number of detecting drive lines). φSH represents the level of a control signal supplied to a sample/hold circuit SH of the amplifying unit 161. φR represents the level of a control signal supplied to a differential amplifier circuit AMP of the amplifying unit 161. "Detecting pixel signal" indicates the value of a signal read out from the detecting pixel 104. "Correcting pixel signal" indicates the value of a signal read out from the correcting pixel 107. "Integral irradiation dose" indicates the integral value of radiation applied to the radiation imaging apparatus 100. A method of deciding this integral value will be described later.

At time t0, the drive control unit 180 starts the reset operation of a plurality of pixels. The reset operation is the operation of removing electric charge accumulated in the conversion element of each pixel and more specifically the operation of rendering the switch element of each pixel conductive by supplying a drive signal to the drive line 110. The drive control unit 180 controls the drive circuit 150 to reset each pixel connected to the drive line 110 on the first row. Subsequently, the drive control unit 180 resets each pixel connected to the drive line 110 on the second row. The drive control unit 180 repeats this operation until the drive line 110 on the last row. At time t1, upon ending the reset operation of the drive line 110 on the last row, the drive control unit 180 repeats the reset operation again from the drive line 110 on the first row.

At time t2, the drive control unit 180 receives a start request signal from the control apparatus 200. In response to the reception of the start request signal, the drive control unit 180 performs the reset operation until the last row and ends the reset operation at time t3. Note that the drive control unit 180 may end the reset operation before performing the reset operation until the last row and shift to next processing. For example, upon receiving a start request signal during the reset operation of the drive line 110 on the kth row, the drive control unit 180 may shift to next processing without performing the reset operation of the drive lines 110 on the (k+1)th and subsequent rows. In this case, the drive control unit 180 may reduce level differences that can occur in a radiation image by adjusting a drive operation for obtaining a radiation image and performing image processing for a radiation image.

At time t3, the drive control unit 180 starts a deciding operation for deciding the dose of radiation during irradiation of the radiation imaging apparatus 100. In the deciding operation, the drive control unit 180 repeatedly performs the readout operation of reading out from the detecting pixel 104 and the correcting pixel 107. Of the plurality of times of readout operation, one or more readout operations in the first half are performed to decide a correction value, and a readout operation repeated in the second half is performed to continuously decide the dose of radiation at each time point.

A readout operation is performed for the detecting drive lines 111 and is not performed for the drive lines 110 other than the detecting drive lines 111. More specifically, the drive circuit 150 supplies a drive signal to the drive line 110 (that is, the detecting drive line 111) connected to at least one of the detecting pixel 104 and the correcting pixel 107 of the plurality of drive lines 110. The drive circuit 150 supplies no drive signal to the drive line 110 that is connected to neither the detecting pixel 104 nor the correcting pixel 107 of the plurality of drive lines 110. In addition, the drive circuit 150 simultaneously supplies a drive signal to the drive line 110 connected to at least one of the detecting pixel 104 and the correcting pixel 107 of the plurality of drive lines 110. With this operation, the readout circuit 160 reads out a combination of signals from the plurality of pixels connected to the same signal line 120. Since the detecting pixel 104 and the correcting pixel 107 are exclusively connected to the signal line 120, the readout circuit 160 can separately read out signals from pixels having different sensitivities.

In one readout operation, the drive control unit 180 performs the operations in the interval between time t3 and time t4. More specifically, the drive control unit 180 temporarily supplies drive signals to one or more detecting drive lines 111. Subsequently, the drive control unit 180 holds the signal read out from a pixel by the readout circuit 160 via the signal line 120 in the sample/hold circuit SH by temporarily setting the ϕSH to high level. Thereafter, the drive control unit 180 resets the readout circuit 160 (more specifically, the differential amplifier circuit AMP of the amplifying unit 161) by temporarily setting the control signal ϕR to high level. If a region of interest is set in an imaging region IR, any signal need not be read out from the detecting pixels 104 that are not included in this region of interest.

The drive control unit 180 performs a readout operation a predetermined number of times which is one or more times to decide a correction value. The signal processing unit 170 decides a correction value Od based on the signals read out from the detecting pixel 104 by a predetermined number of times of readout operation and a correction value Oc based on the signals read out from the correcting pixel 107 by a predetermined number of times of readout operation. The decision of the correction value Od will be described in detail. If the predetermined number of times is one, since one signal is read out from the detecting pixel 104, the signal processing unit 170 sets the value of the signal to the correction value Od. If the predetermined number of times is plural, the signal processing unit 170 sets the average value of a plurality of readout signals to the correction value Od. Another statistic value may be used instead of the average value. The correction value Oc is also decided based on the signal read out from the correcting pixel 107 in the same manner. The signal processing unit 170 stores the correction values Od and Oc decided in this manner in the memory unit 172 to allow the correction values to be used for subsequent processing.

Upon ending one or more times of readout operation, the drive control unit 180 transmits a start enable signal to the communication I/F 503 at time t5. The above correction values Od and Oc may be decided before or after the transmission of a start enable signal. The drive control unit 180 repeatedly performs the above readout operation after the transmission of a start enable signal. The signal processing unit 170 measures an irradiation dose of radiation for each readout operation and determines whether the integral value of the measured doses exceeds a threshold. The drive control unit 180 starts irradiation at time t6 after time t5.

A method of deciding the irradiation dose DOSE will be described below. Sd represents the value of a signal read out from the detecting pixel 104 by a latest readout operation. Sc represents the value of a signal read out from the correcting pixel 107 by a latest readout operation. The signal processing unit 170 calculates DOSE by applying Sd, Sc, Od, and Oc to equation (1).

$$DOSE = (Sd - Od) - (Sc - Oc) \quad (1)$$

According to this equation, DOSE is decided based on the difference between the value Sc of a signal read out from the correcting pixel 107 after the transmission of a start enable signal and the correction value Oc decided based on a signal read out from the correcting pixel 107 before the transmission of the start enable signal.

The signal processing unit 170 may calculate DOSE by applying Sd, Sc, Od, and Oc to equation (2) instead of equation (1).

$$DOSE = Sd - Od \times Sc/Oc \quad (2)$$

In this equation, DOSE is decided based on the ratio between the value Sc of a signal read out from the correcting pixel 107 after the transmission of a start enable signal and the correction value Oc decided based on a signal read out the correcting pixel 107 before the transmission of the start enable signal.

As shown in FIG. 4, a signal read out from the detecting pixel 104 greatly changes immediately after the end of a reset operation (immediately after time t3) and is stabilized with the lapse of time (for example, about 100 ms). For this reason, an offset amount cannot be sufficiently removed by calculating DOSE using only Sd and Od obtained from the detecting pixel 104. Delaying a readout operation for obtaining the correction value Od until a signal read out from the detecting pixel 104 is stabilized will prolong the time from the transmission of a start enable signal to the start of actual irradiation (the time from time t2 to time t6; a so-called exposure delay).

In this embodiment, the irradiation dose DOSE is decided by further using the values (Sc and Oc) of signals read out from the correcting pixel 107. Since the correcting pixel 107 has very low sensitivity to radiation, the value Sc of a signal read out from the correcting pixel 107 after the start of irradiation can be regarded as an offset component of the value Sd of a signal read out from the detecting pixel 104. In this embodiment, the irradiation dose DOSE is decided by using the correction values Od and Oc based on signals read out from the detecting pixel 104 and the correcting pixel 107 before the start of irradiation. This makes it possible to correct differences between characteristics unique to the respective pixels (differences between the channels of a detecting circuit, each pixel parasitic resistance, differences in parasitic capacitance, and the like).

The drive control unit 180 outputs an end request signal when the integral irradiation dose reaches the threshold at time t7. Instead of this operation, the drive control unit 180 may estimate the time when the integral irradiation dose reaches the threshold and output an end request signal at the estimated time. At time t8, the radiation generating unit 300 ends irradiation in accordance with the end request signal.

In the above case, the drive control unit 180 starts the readout operation to be performed a predetermined number of times to decide the correction values Od and Oc immediately after the end of the reset operation. Instead of this operation, the drive control unit 180 may start a readout operation to be performed a predetermined number of times after the lapse of a predetermined time (for example, several ms to several tens of ms) since the end of a reset operation. This makes it possible to suppress reading of signals in a period during which temporal variation is especially large.

As described above, the radiation imaging system 10 requires a period (t3 to t5) for offset data obtaining to use AEC. That is, the radiation imaging apparatus 100 receives a start request signal, ends a reset operation, and then outputs a start enable signal after the lapse of an offset data obtaining period. However, such an offset data obtaining period is a wasted time when imaging is performed without using AEC. Accordingly, this embodiment is configured to decide whether to obtain offset data of the receptor field 301 depending on whether the radiation imaging system 10 performs AEC, thereby reducing or preventing a delay in the irradiation start time due to the obtaining of unnecessary offset data.

Figure 5:
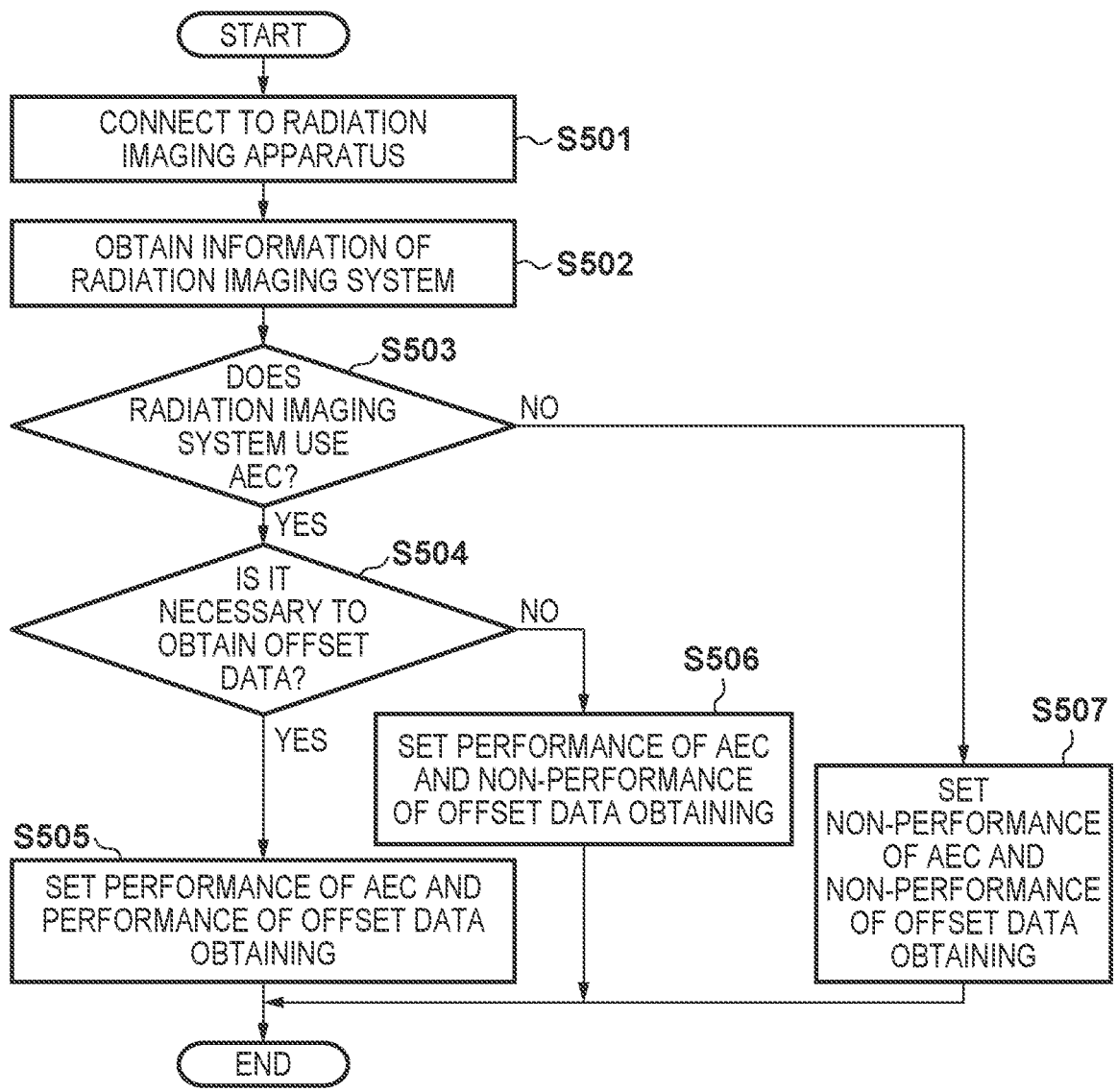
FIG. 5 is a flowchart showing processing by the control apparatus according to the first embodiment.

FIG. 5 is a flowchart for explaining processing by the control apparatus 200 according to this embodiment. First of all, in step S501, the control unit 211 of the control apparatus 200 connects to the radiation imaging apparatus 100 via the communication unit 212. The control unit 211 can also connect to the network 400 via the communication unit 212 and obtain necessary information from the RIS 410, the PACS 420, and the HIS 430. In step S502, the determination unit 216 obtains information of the radiation imaging system 10 from the holding unit 214. The information obtained in this case includes information for determining whether to perform radiation imaging using AEC. Whether to perform radiation imaging is set by a service man or a specific user of the radiation imaging system 10 performing a predetermined operation.

In step S503, the determination unit 216 determines whether to perform imaging using AEC based on information of the radiation imaging system 10 which is obtained from the holding unit 214 in step S502. If the radiation imaging system 10 determines that imaging using AEC is performed (YES in step S503), the process advances to step S504. In contrast to this, if the radiation imaging system 10 determines that AEC is not used (NO in step S503), the process advances to step S507. In step S504, the determination unit 216 determines whether it is necessary to obtain offset data used for the offset correction of the receptor field 301 incorporated in the radiation imaging apparatus 100. If the determination unit 216 determines that it is necessary to obtain offset data (YES in step S504), the process advances to step S505. If the determination unit 216 determines that it is not necessary to obtain offset data (NO in step S504), the process advances to step S506. Whether it is necessary to obtain offset data can be determined depending on whether, for example, a predetermined time has elapsed since previous offset data is obtained. If the predetermined time has elapsed since the previous offset data is obtained, the determination unit 216 determines that it is necessary to obtain offset data.

In step S505, the AEC control unit 215 sets performance of AEC and performance of offset data obtaining in the drive control unit 180 of the radiation imaging apparatus 100 via the communication unit 212. In step S506, the AEC control unit 215 sets performance of AEC and non-performance of offset data obtaining in the drive control unit 180 via the communication unit 212. Note that in steps S505 and S506, the AEC control unit 215 may set a dose threshold. In addition, in step S507, the AEC control unit 215 sets non-performance of AEC and offset data obtaining in the drive control unit 180 via the communication unit 212. Note that a system configured to always obtain offset data before the start of radiation imaging when performing AEC can omit steps S504 and S506.

Figure 6:
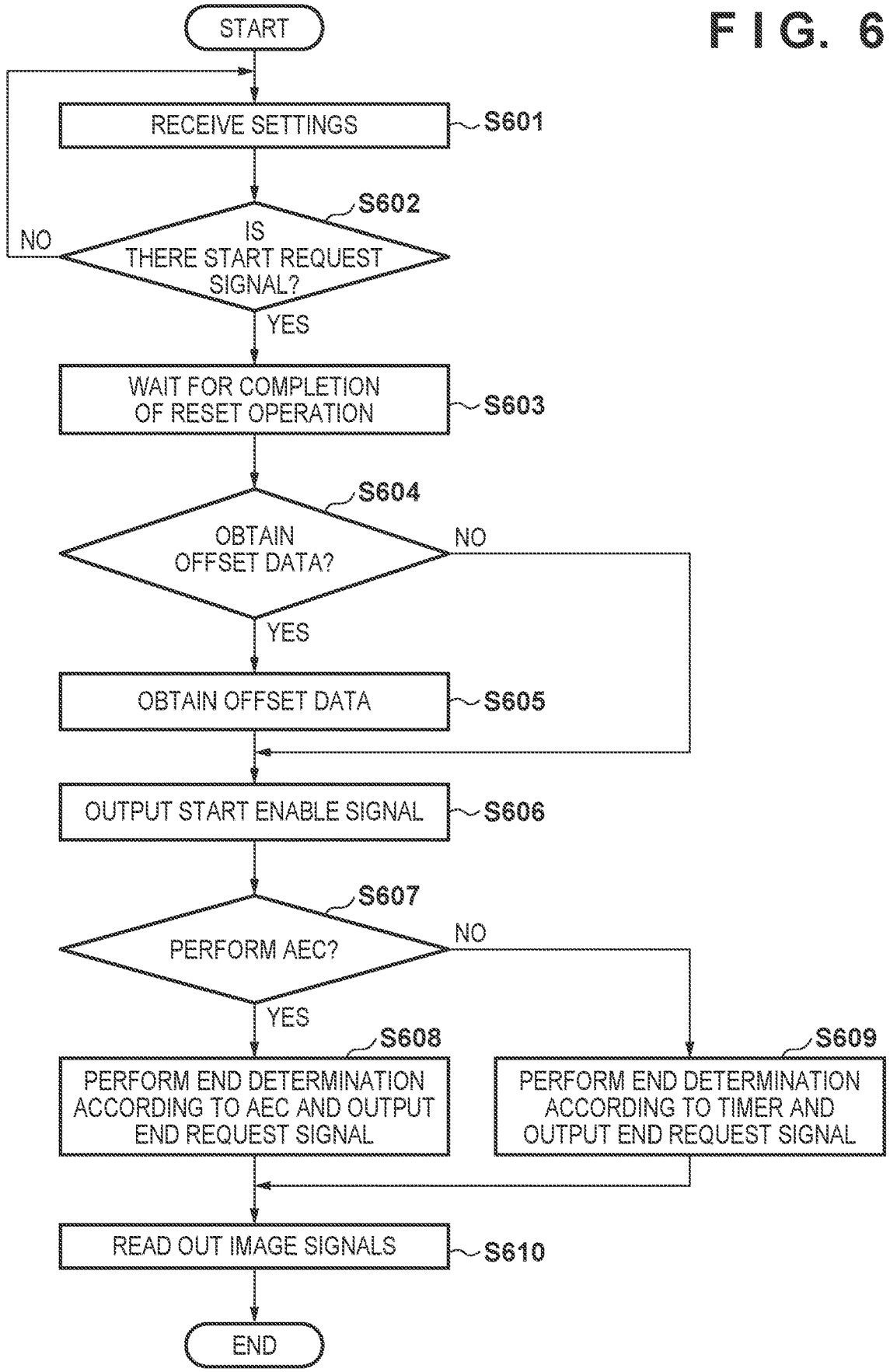
FIG. 6 is a flowchart showing processing by the radiation imaging apparatus according to the first embodiment.

The next will describe drive control of the radiation imaging apparatus 100 by the drive control unit 180 in accordance with the setting of performance/non-performance of AEC and offset data obtaining by the AEC control unit 215. FIG. 6 is a flowchart for explaining drive control of the radiation imaging apparatus 100 by the drive control unit 180 according to this embodiment.

In step S601, the drive control unit 180 receives the settings of performance/non-performance of offset data obtaining and performance/non-performance of AEC from the control apparatus 200 via the communication I/F 503. The AEC control unit 215 makes these settings in steps S505 to S507. In step S602, the drive control unit 180 determines the presence/absence of a start request signal. If no start request signal is received (NO in step S602), the process returns to step S601. In contrast to this, if a start request signal is received (YES in step S602), the process advances to step S603. This operation corresponds to time t2 in FIG. 4.

In step S603, the drive control unit 180 waits for the completion of the reset operation being performed. When the reset operation is completed, the process advances to step S604. This operation corresponds to time t3 in FIG. 4. In step S604, the drive control unit 180 determines whether to perform offset data obtaining in the current imaging operation. If in step S505 in FIG. 5, the AEC control unit 215 sets performance of offset data obtaining (YES in step S604), the drive control unit 180 performs offset data obtaining in step S605. That is, the drive control unit 180 performs driving from time t3 to time t5 (correction value decision period) in FIG. 4. In contrast to this, if the AEC control unit 215 makes setting of non-performance of offset data obtaining in step S506 or S507 in FIG. 5 (NO in step S603), the process advances to step S606 upon skipping step S605. That is, if non-performance of offset data obtaining is set, offset data obtaining is omitted.

If offset data obtaining is completed, the drive control unit 180 outputs a start enable signal for permitting the start of exposure in step S606 (time t5 in FIG. 4). According to the above processing, if performance of offset data obtaining is set, offset data obtaining processing indicated from time t3 to time t5 is performed; otherwise, a start enable signal is output immediately after the completion of a reset operation. The radiation generating unit 300 starts irradiation in accordance with the start enable signal.

In step S607, the drive control unit 180 determines whether the AEC control unit 215 has set performance of AEC. If the AEC control unit 215 has set performance of AEC in step S505 or S506 (YES in step S607), the process advances to step S608. In step S608, the drive control unit 180 performs AEC described with reference to FIG. 4. That is, the signal processing unit 170 calculates an integral irradiation dose according to equation (1) or (2) and performs end determination by comparing the integral irradiation dose calculated by the drive control unit 180 with a threshold. If the integral irradiation dose exceeds the threshold, the drive control unit 180 outputs an end request signal to the radiation generating unit 300. This operation corresponds to time t7 in FIG. 4. If the AEC control unit 215 has set performance of AEC and non-performance of offset data obtaining in step S506 in FIG. 5, the drive control unit 180 calculates an integral irradiation dose by using past offset data that has already been obtained. As offset data to be used, for example, as past offset data, latest offset data can be used.

After an end request signal is output, in step S610, the drive control unit 180 reads out image signals from a plurality of imaging pixels arrayed in the imaging region IR (corresponding to the interval between time t8 and time t9 in FIG. 4). The drive control unit 180 generates a radiation image from image signals obtained in this manner and outputs the image to the control apparatus 200.

If the AEC control unit 215 has set non-performance of AEC in step S507 (NO in step S607), the process advances to step S609. In step S609, the drive control unit 180 determines the end of exposure based on a timer and outputs an end request signal to the radiation generating unit 300. Note that the radiation generating unit 300 may determine the end of exposure based on the timer. The drive control unit 180 determines the end of irradiation in accordance with when, for example, the detecting pixel 104 detects no radiation.

Note that the drive control unit 180 may perform at least part of the processing shown in the flowchart in FIG. 5. For example, upon receiving the setting of the use of AEC from the control apparatus 200, the drive control unit 180 may determine whether it is necessary to obtain offset data and decide performance/non-performance of offset data obtaining. Assume that AEC is not used. In this case, in order to prevent a failure to set a radiation field irradiation time, if NO is determined in step S503, the control unit 211 may inform information indicating non-performance of AEC using the display unit 230.

As described above, according to the first embodiment, even the radiation imaging system using the radiation imaging apparatus incorporating the AEC function omits the obtaining of offset data of the receptor field when the system does not perform AEC. This makes it possible to prevent or reduce a delay until irradiation which occurs due to offset data obtaining, thus improving the examination efficiency. Even when AEC is performed, since offset data obtaining is omitted unless a predetermined time has elapsed since the obtaining of the previous offset data, a further improvement in examination efficiency can be expected.

Second Embodiment

The first embodiment has exemplified the case in which whether to obtain offset data is decided depending on whether the radiation imaging system performs Automatic Exposure Control (AEC). As described with reference to FIGS. 1A and 1B, since the radiation imaging apparatus 100 is connected to the control apparatus 200 by communication, the user can select a radiation imaging apparatus used for imaging. That is, there is conceivable an arrangement in which a plurality of radiation imaging apparatuses are registered in the radiation imaging system 10 to allow the user to select a radiation imaging apparatus used for imaging in accordance with a room for radiation imaging, an imaging region, or the like. In this case, even with the setting made to make the radiation imaging system use AEC, when a radiation imaging apparatus without an AEC function is selected, radiation imaging using AEC cannot be performed. In this case, the user needs to set an irradiation time and the like suitable for an imaging technique or make a change to a radiation imaging apparatus having an AEC function. Accordingly, the second embodiment will exemplify an arrangement configured to determine for each radiation imaging apparatus whether it has an AEC function and notify whether AEC can be performed.

Figure 7:
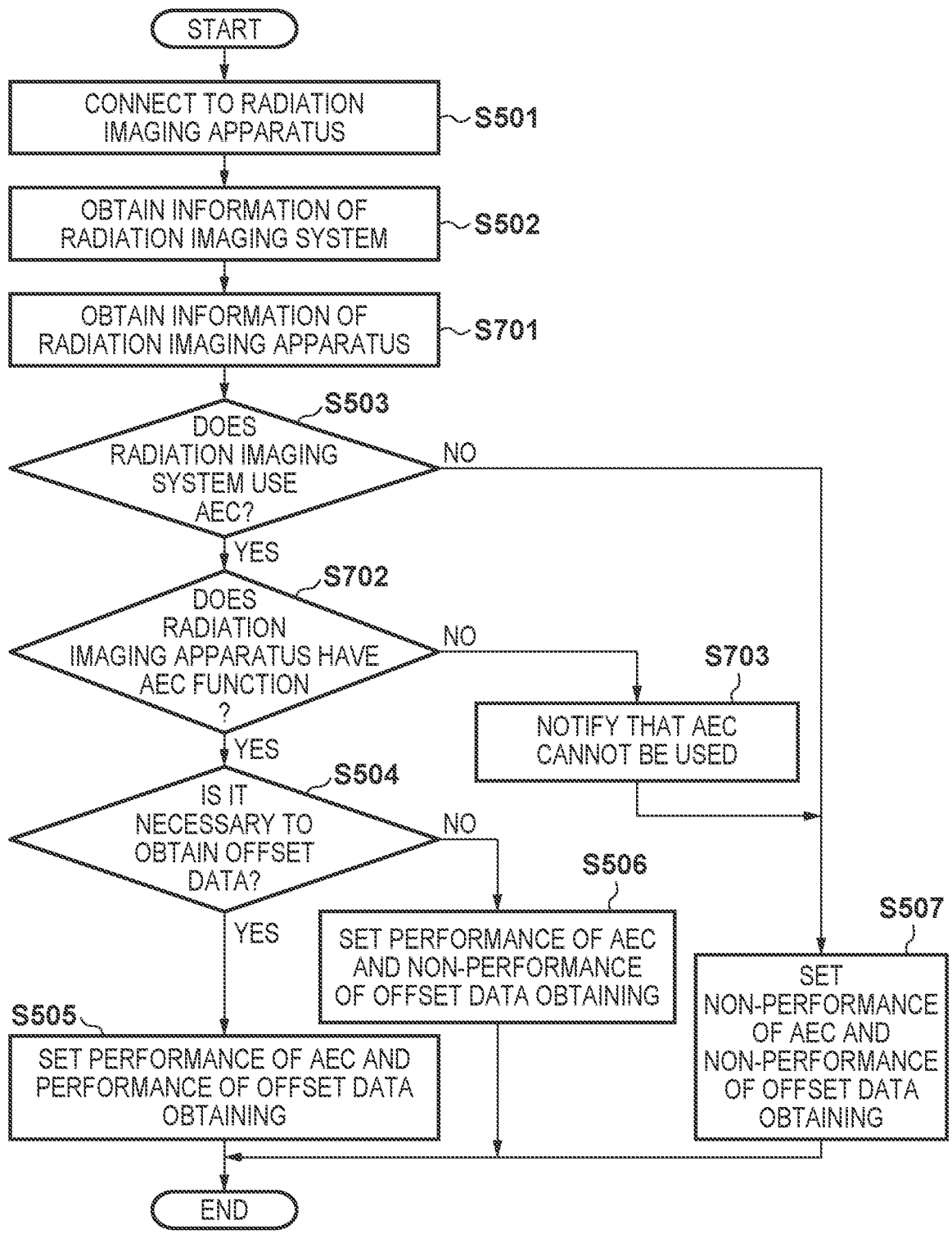
FIG. 7 is a flowchart showing processing by a control apparatus according to the second embodiment.

The arrangement of a radiation imaging system 10 according to the second embodiment is the same as that of the first embodiment (FIGS. 1A to 4). FIG. 7 is a flowchart showing processing by a control apparatus 200 according to the second embodiment. The processing shown in FIG. 7 replaces the processing in the first embodiment (FIG. 5), and processes similar to those in the first embodiment will be denoted by the same reference numerals and symbols.

In step S701, a determination unit 216 communicates with a connected radiation imaging apparatus 100 via a communication unit 212 and obtains information of the radiation imaging apparatus 100. The information of the radiation imaging apparatus 100 obtained in this case includes information concerning whether the connected radiation imaging apparatus 100 has an AEC function. If the radiation imaging system 10 is set to use AEC (YES in step S503), the process advances to step S702. In step S702, the determination unit 216 determines, from the information of the radiation imaging apparatus 100 obtained in step S701, whether the radiation imaging apparatus 100 has the AEC function. Note that in step S701, the model number of the radiation imaging apparatus 100 may be obtained, and the determination unit 216 may refer to a table indicating the correspondence between the model number of the radiation imaging apparatus and the presence/absence of the AEC function to determine whether the radiation imaging apparatus 100 has the AEC function.

If the determination unit 216 determines that the radiation imaging apparatus 100 has the AEC function (YES in step S702), the process advances to step S504. If the determination unit 216 determines that the radiation imaging apparatus 100 does not have the AEC function (NO in step S702), the process advances to step S703. In this case, in spite of the designation indicating that the radiation imaging system 10 uses the AEC function, since the connected radiation imaging apparatus does not have the AEC function, imaging using AEC cannot be performed. Accordingly, in step S703, an AEC control unit 215 notifies the user via the display unit 230 that AEC cannot be used. Subsequently, the process advances to step S507.

As described above, the second embodiment is configured to determine for each radiation imaging apparatus whether it has the AEC function. Accordingly, if a radiation imaging apparatus having no AEC function is connected in spite of the setting indicating that the radiation imaging system uses AEC, the corresponding notification can be made. This prompts the user to replace the radiation imaging apparatus with a radiation imaging apparatus having the AEC function. Alternatively, it is possible to prevent a failure to set an irradiation time when using a radiation imaging apparatus having no AEC function. This makes it possible to improve the examination efficiency. Note that as in the first embodiment, a drive control unit 180 may perform at least part of the processing shown in the flowchart in FIG. 7.

Third Embodiment

The first embodiment has exemplified the case in which the radiation imaging system decides whether to obtain offset data depending on whether to perform Automatic Exposure Control (AEC). The third embodiment will exemplify an arrangement configured to determine for each imaging technique whether to obtain data for the offset correction of the receptor field and determining whether to perform AEC. In some imaging operation using a radiation imaging apparatus having the AEC function, imaging is sometimes performed without using Automatic Exposure Control (AEC) depending on the imaging technique. For example, such cases include a case in which a portion where a receptor field for detecting the dose of radiation is arranged does not coincide with an imaging region of a patient. For such an imaging technique, settings are generally made not to use automatic exposure control. An imaging technique using no AEC need not obtain offset data for the offset correction of a receptor field even with the use of a radiation imaging apparatus having the AEC function. Performing such unnecessary offset data obtaining can lead to a deterioration in examination efficiency.

Figure 8:
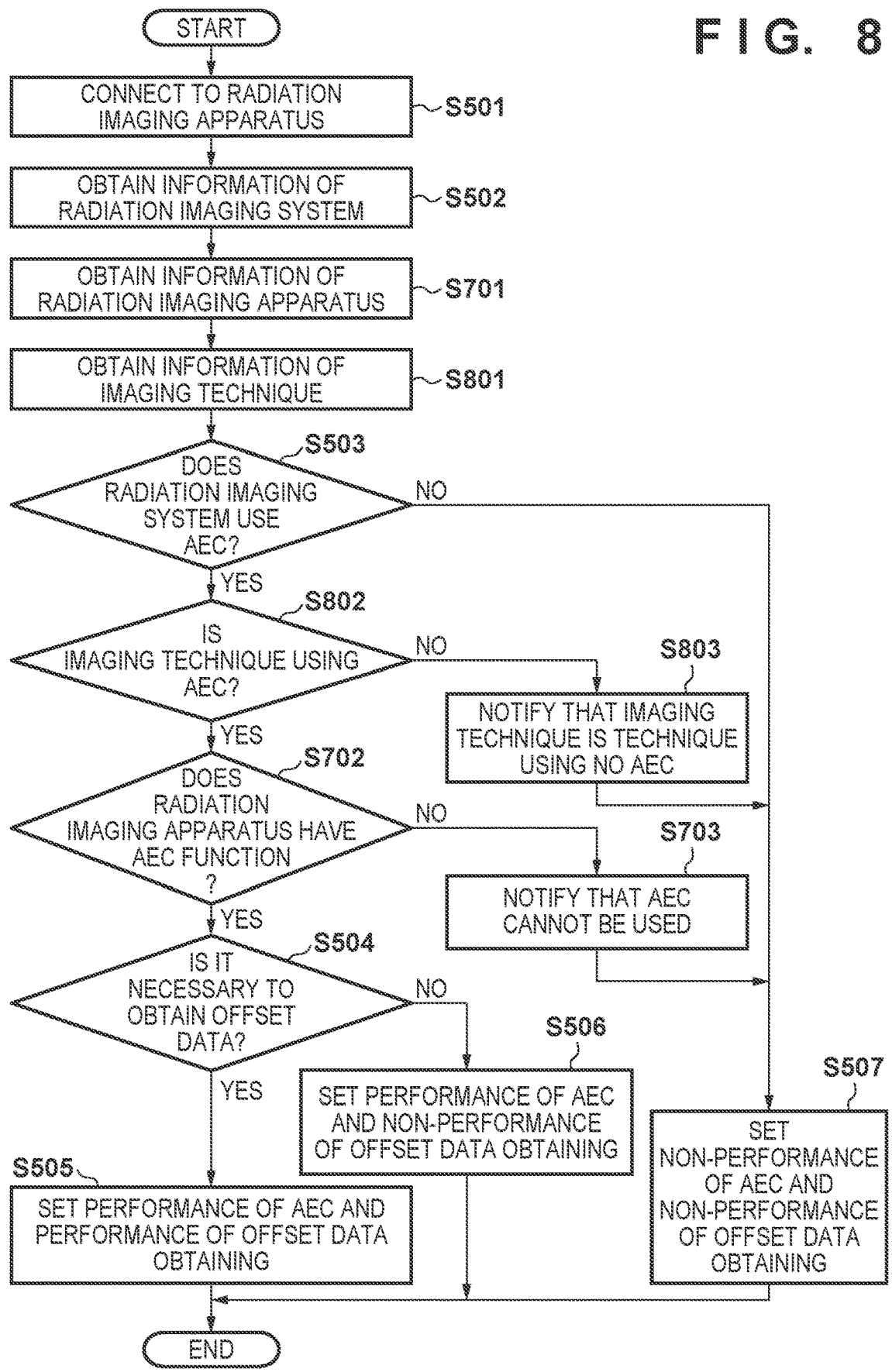
FIG. 8 is a flowchart showing processing by a control apparatus according to the third embodiment.

The arrangement of a radiation imaging system 10 according to the third embodiment is similar to that of the first embodiment (FIGS. 1A to 4). FIG. 8 is a flowchart showing processing by a control apparatus 200 according to the third embodiment. The processing shown in FIG. 8 replaces the processing in the first embodiment (FIG. 5) and the processing in the second embodiment (FIG. 7), and processes similar to those in the first and second embodiments will be denoted by the same reference numerals and symbols.

In step S801, a determination unit 216 obtains information of an imaging technique. For example, the determination unit 216 can receive information of an imaging technique from an RIS 410. Alternatively, for example, the determination unit 216 can obtain information of an imaging technique set by a radiation technician via an operation unit 240. In step S802, the determination unit 216 determines, from the information of the imaging technique obtained in step S801, whether imaging by the imaging technique is imaging using AEC. The determination unit 216 has a table 900 linking imaging techniques to the availability of AEC, as shown in FIG. 9A, and determines whether the imaging technique obtained in step S801 uses AEC. If the determination unit 216 determines that AEC is used (YES in step S802), the process advances to step S702. In contrast to this, if the determination unit 216 determines that AEC is not used (NO in step S802), the process advances to step S803. In step S803, the AEC control unit 215 notifies the user that the imaging technique is a technique using no AEC. Subsequently, the process advances to step S507.

Note that if a plurality of radiation imaging apparatuses having different arrangements of receptor fields are available, it may be determined whether AEC can be used depending on the relationship between the type (the arrangement of receptor fields) of connected radiation imaging apparatus and an imaging technique. In this case, as shown in FIG. 9B, for example, the determination unit 216 holds a table 901 indicating the correspondence between imaging techniques, the types (for example, the model numbers) of radiation imaging apparatuses, and the settings indicating the availability of AEC. The determination unit 216 then determines the use/non-use of AEC by referring to the table 901 based on the information (model number) of the radiation imaging apparatus obtained in step S701 and the information of the imaging technique obtained in step S801.

As described above, according to the third embodiment, determining, for each imaging technique, whether to obtain data for the offset correction of receptor fields makes it possible not to obtain the data when using an imaging technique without AEC even if the radiation imaging apparatus has the AEC function. This makes it possible to further improve the examination efficiency by eliminating a delay until irradiation due to offset data obtaining and offset correction processing for receptor fields in an imaging technique using no automatic exposure control. In addition, when non-performance of AEC is decided based on an imaging technique, the corresponding notification is made (step S803). This makes it possible to prevent, for example, a failure to set an irradiation time. Note that as in the first and second embodiments, a drive control unit 180 may perform at least part of the processing shown in the flowchart in FIG. 8.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-054320, filed Mar. 29, 2022, which is hereby incorporated by reference herein in its entirety.

What is claimed is:

1. A radiation imaging system including a radiation imaging apparatus having a function of automatic exposure control and a control apparatus, the system comprising a processor and a memory storing a program which, when executed by the processor causes the radiation imaging apparatus or the control apparatus to function as:
    a first obtaining unit configured to obtain offset data for a detecting pixel used for the automatic exposure control before permission to start irradiation after reception of a start request signal in the radiation imaging apparatus;
    a determination unit configured to determine whether to perform the automatic exposure control; and
    a control unit configured to permit start of irradiation after the first obtaining unit obtains offset data when the determination unit determines that the automatic exposure control is performed, and to permit start of irradiation upon omitting offset data obtaining by the first obtaining unit when the determination unit determines that the automatic exposure control is not performed.

2. The system according to claim 1, wherein the processor further causes the radiation imaging apparatus or the control apparatus to function as a holding unit configured to hold set information indicating whether to perform automatic exposure control, and the determination unit determines whether to perform automatic exposure control based on the set information held in the holding unit.

3. The system according to claim 1, wherein the processor further causes the radiation imaging apparatus or the control apparatus to function as a second obtaining unit configured to obtain information indicating an imaging technique for a radiation image to be performed, and the determination unit determines whether to perform automatic exposure control based on the imaging technique.

4. The system according to claim 3, further comprising a table indicating correspondence between an imaging technique and information indicating whether automatic exposure control is performed, wherein the determination unit determines whether to perform automatic exposure control by referring to the table.

5. The system according to claim 3, further comprising a table indicating correspondence between an imaging technique and information indicating whether automatic exposure control is performed for each type of radiation imaging apparatus, wherein the determination unit determines whether to perform automatic exposure control based on a type of the radiation imaging apparatus and the imaging technique obtained by the second obtaining unit by referring to the table.

6. The system according to claim 1, wherein the processor causes the radiation imaging apparatus or the control apparatus to function as a receiving unit configured to receive information from the radiation imaging apparatus indicating whether the radiation imaging apparatus has a function of automatic exposure control; and the processor further causes the radiation imaging apparatus or the control apparatus to function as a notifying unit configured to notify that automatic exposure control cannot be performed when the radiation imaging apparatus has no function of automatic exposure control despite the determination unit determining that automatic exposure control is performed.

7. The system according to claim 1, wherein the determination unit further determines whether to perform offset data obtaining for automatic exposure control in the radiation imaging apparatus upon determining that automatic exposure control is performed, and the control unit omits the first obtaining unit obtaining offset data when it is determined that offset data obtaining is not performed even in a case in which automatic exposure control is performed.

8. The system according to claim 7, wherein the determination unit determines whether to perform offset data obtaining based on whether a predetermined time has elapsed since previous obtaining of offset data.

9. A radiation imaging apparatus including a detecting pixel for performing automatic exposure control and an imaging pixel for performing radiation imaging, the apparatus comprising a processor and a memory storing a program which, when executed by the processor causes the radiation imaging apparatus or the control apparatus to function as:

an obtaining unit configured to obtain offset data for a detecting pixel used for the automatic exposure control before start of irradiation is permitted upon reception of a start request signal;

a communication unit configured to receive set information indicating whether to perform automatic exposure control from an external control apparatus; and a control unit configured to permit start of irradiation upon obtaining offset data by the obtaining unit when the set information indicates that the automatic exposure control is performed, and to permit start of irradiation upon omitting offset data obtaining by the obtaining unit when the set information indicates that the automatic exposure control is not performed.

10. The apparatus according to claim 9, wherein the set information further includes a setting indicating whether offset data obtaining is performed, and the control unit omits the obtaining unit obtaining offset data even with a setting of performance automatic exposure control when the set information indicates that offset data obtaining is not performed.

11. The apparatus according to claim 10, wherein automatic exposure control is performed using offset data obtained in the past when the set information indicates that automatic exposure control is performed and offset data obtaining is not performed.

12. A control method for a radiation imaging system including a radiation imaging apparatus having a function of automatic exposure control and a control apparatus, the method comprising:

obtaining offset data for a detecting pixel used for the automatic exposure control before permission to start irradiation after reception of a start request signal in the radiation imaging apparatus;

determining whether to perform the automatic exposure control; and permitting start of irradiation after obtaining offset data when it is determined that the automatic exposure control is performed, and permitting start of irradiation upon omitting offset data obtaining when it is determined that the automatic exposure control is not performed.

13. A control method for a radiation imaging apparatus including a detecting pixel for performing automatic exposure control and an imaging pixel for performing radiation imaging, the method comprising:

obtaining offset data for a detecting pixel used for the automatic exposure control before start of irradiation is permitted upon reception of a start request signal;

receiving set information indicating whether to perform automatic exposure control from an external control apparatus; and permitting start of irradiation upon obtaining offset data when the set information indicates that the automatic exposure control is performed, and permitting start of irradiation upon omitting offset data obtaining when the set information indicates that the automatic exposure control is not performed.

14. A non-transitory computer-readable medium storing a program for causing a computer to perform a control method for a radiation imaging apparatus including a detecting pixel for performing automatic exposure control and an imaging pixel for performing radiation imaging, the method comprising:

obtaining offset data for a detecting pixel used for the automatic exposure control before start of irradiation is permitted upon reception of a start request signal;

receiving set information indicating whether to perform automatic exposure control from an external control apparatus; and permitting start of irradiation upon obtaining offset data when the set information indicates that the automatic exposure control is performed, and permitting start of irradiation upon omitting offset data obtaining when the set information indicates that the automatic exposure control is not performed.

15. The system according to claim 1, wherein the control apparatus is configured to communicate with the determination unit, the control unit and the radiation imaging apparatus.

* * * * *